United States Patent [19]
Okamura

[11] Patent Number: 4,900,140
[45] Date of Patent: Feb. 13, 1990

[54] REAR MONITORING DEVICE FOR VEHICLE

[76] Inventor: Makoto Okamura, 1567-4 Sakata, Okegawa-shi, Saitama-ken, Japan

[21] Appl. No.: 109,823

[22] Filed: Oct. 16, 1987

[30] Foreign Application Priority Data

Oct. 27, 1986 [JP] Japan .................................. 61-164892

[51] Int. Cl.$^4$ .......................... G02B 3/08; G02B 17/00; B60R 1/04; B60R 1/08
[52] U.S. Cl. .................................. 350/452; 248/467; 350/445; 350/632
[58] Field of Search ............... 350/452, 604, 605, 606, 350/445, 632; 248/467

[56] References Cited

U.S. PATENT DOCUMENTS

| | | | |
|---|---|---|---|
| 2,953,961 | 9/1960 | Court | 350/452 |
| 3,809,461 | 5/1974 | Baumgardner et al. | 350/452 X |
| 3,809,462 | 5/1974 | Baumgardner et al. | 350/452 X |
| 3,826,562 | 7/1974 | Baumgardner et al. | 350/452 X |
| 3,972,596 | 8/1976 | Baumgardner et al. | 350/452 X |
| 4,260,317 | 4/1981 | Traeger et al. | 350/1.2 |
| 4,274,714 | 6/1981 | Okamura | 350/452 |
| 4,497,541 | 2/1985 | Okamura | 350/626 |
| 4,573,773 | 3/1986 | Arndt et al. | 350/541 |

*Primary Examiner*—Scott J. Sugarman
*Attorney, Agent, or Firm*—Steinberg & Raskin

[57] ABSTRACT

A rear monitoring device for a vehicle capable of being installed in the interior of a vehicle to enable a driver to observe therethrough the area to the rear of the vehicle. The rear monitoring device includes an optical mechanism and a mounting structure for mounting the optical mechanism on the inner surface of a rear window glass to cause the optical mechanism to form an image of the area to the rear of the vehicle and transfer the image to the driver. The mounting mechanism includes a bendable mounting member which is formed of a metal sheet into a substantially L or Z shape and serves to mount the optical mechanism on the vehicle therethrough and an adhesion element for bonding the bendable mounting member to the rear window glass. The bendable mounting member may be so deformable that an angle of the optical mechanism with respect to the rear window glass may be variably set.

17 Claims, 3 Drawing Sheets

REAR MONITORING DEVICE FOR VEHICLE

BACKGROUND OF THE INVENTION

1. Field of the Invention

This invention relates to a rear monitoring device for a vehicle, and more particularly to a rear monitoring device for a vehicle which is adapted to permit a driver of a vehicle such as a car or the like to confirm therethrough that the rear of the vehicle or the area or space behind the vehicle is safe.

2. Description of the Prior Art

In general, the rear of a vehicle such as a car, particularly its lower region, is outside the visual field of a driver in a driver's seat. Accordingly, when a driver backs up a vehicle, it is first necessary for the driver to get out of the vehicle to confirm that the area behind the vehicle is safe. This is highly inconvenient and troublesome to the driver.

Some approaches to such a problem have been proposed in the prior art. One of the approaches is to mount a convex mirror on an upper portion of a rear section of a vehicle. However, this method has an important defect in that it causes noteworthy distortion of the image obtained and highly narrows the visual field because the mirror used is convex. Also, it exhibits further disadvantages, such as causing deterioration of the aesthetic appearance of the vehicle, corrosion of the mirror mounting section of the vehicle, and making it possible to steal the mirror because the mirror is mounted on the exterior of the vehicle.

Another approach is to monitor the area to the rear of the vehicle by means of a radio wave. However, this method not only fails to monitor with high accuracy because it utilizes indirect detection due to reflection of a radio wave, but it also causes many problems, such as failure of the radio wave generator, expenses due to use of the generator, and the like.

A further approach is to utilize image transmission by means of a TV camera and receiver set. This method functions satisfactorily and safely, however, it greatly increases expenses because the receiver set is highly expensive. Also, this method is limited to use by only a specific vehicle, such as a large-sized vehicle or the like, because it is necessary to install a TV camera on the outside of the vehicle and position a TV receiver adjacent to the driver's seat.

In view of the foregoing, the inventor proposed a viewer which is typically disclosed in U.S. Pat. No. 4,688,905 issued on Aug. 25, 1987. The viewer is constructed in a manner such that at least one Fresnel concave lens and one or two reflecting mirrors are arranged in a casing formed with a plurality of see-through openings. However, when the viewer is to be mounted on the rear window glass of a vehicle, it is necessary to set the inclination angle of the window glass within a range of 70° to 90°. As the inclination angle is decreased below 70 degrees, the outer edge of the concave lens causes white turbidity to render an image indistinct. Thus, application of the conventional viewer is limited to a specific vehicle.

Further, the above-described construction of the viewer taught in the U.S. Pat. No. 4,688,905 makes it necessary to install the viewer on the exterior of the vehicle; accordingly, it is necessary to make the viewer waterproof. Also, such a construction causes disadvantages, such as deterioration of the aesthetic appearance of the vehicle, corrosion of the viewer mounting section of the vehicle and making it possible to steal the viewer because the mirror is mounted on the outside of the vehicle.

Furthermore, the arrangement of the conventional viewer on the exterior of the vehicle causes the viewer to hinder the operation of automatically washing a vehicle by an automatic washing apparatus. Also, such an arrangement prevents the smooth operation of the rear window wiper.

Accordingly, it would be highly desirable to develop a rear monitoring device for a vehicle which is capable of being installed in the interior of a vehicle and which can function with high accuracy, have a simple structure and be inexpensive, to thereby eliminate the above-noted disadvantages of the prior art.

SUMMARY OF THE INVENTION

Generally speaking, in accordance with the present invention, a rear monitoring device for a vehicle is provided which is adapted to permit the driver in the driver's seat to observe the area to the rear of the vehicle therethrough. The device includes an optical mechanism for forming an image of the area to the rear of the vehicle and transferring the image to the driver. The optical mechanism is arranged in the vehicle by mounting means, which is mounted on the inner surface of the rear window glass of the vehicle.

In a preferred embodiment, the mounting means is adapted to be so bendable that the angle of the optical mechanism with respect to the rear window glass may be variably set.

In a preferred embodiment of the present invention, the optical mechanism includes a casing opened at the bottom and front walls thereof and a Fresnel concave lens and a mirror element arranged in the casing. The Fresnel concave lens is arranged to cover an opening in the bottom wall of the casing. The mirror is arranged to reflect an image formed thereon through the Fresnel concave lens in such a direction as to cause the so-formed image to be outwardly discharged through an opening in the front wall toward the driver.

Accordingly, it is an object of the present invention to provide a rear monitoring device for a vehicle which is capable of being installed in the interior of a vehicle.

It is another object of the present invention to provide a rear monitoring device for a vehicle which is capable of functioning with high accuracy, has a simple structure and is inexpensive.

It is a further object of the present invention to provide a rear monitoring device for a vehicle which is capable of satisfactorily functioning for a long period of time.

It is still another object of the present invention to provide a rear monitoring device for a vehicle which is capable of ensuring the smooth and safe operation of the vehicle.

It is yet another object of the present invention to provide a rear monitoring device for a vehicle which is capable of providing a driver with a wide visual field.

It is still a further object of the present invention to provide a rear monitoring device for a vehicle which is capable of effectively accomplishing the above-noted objects with a simple structure.

Still other objects and advantages of the invention will be apparent from the specification.

The invention accordingly comprises the features of construction, combination of elements, and arrangements of parts which will be exemplified in the construction hereinafter set forth.

BRIEF DESCRIPTION OF THE DRAWINGS

For a fuller understanding of the invention, reference is had to the following description taken in connection with the accompanying drawings in which like reference numerals designate like or corresponding parts throughout; wherein.

DETAILED DESCRIPTION OF THE PREFERRED EMBODIMENTS

Now, a rear monitoring device for a vehicle according to the present invention will be described hereinafter with reference to the accompanying drawings.

Figure 1:
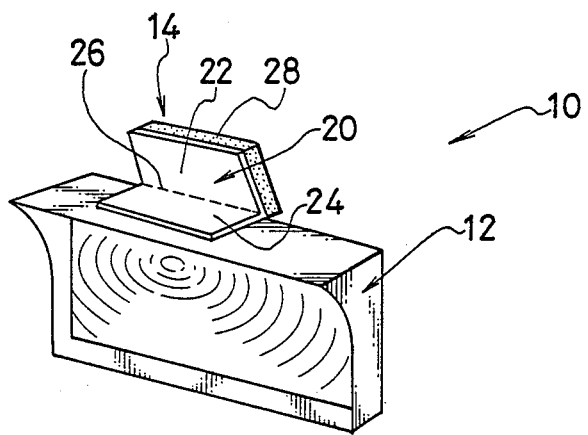
FIG. 1 is a schematic perspective view showing an embodiment of a rear monitoring device for a vehicle according to the present invention.
Figure 2:
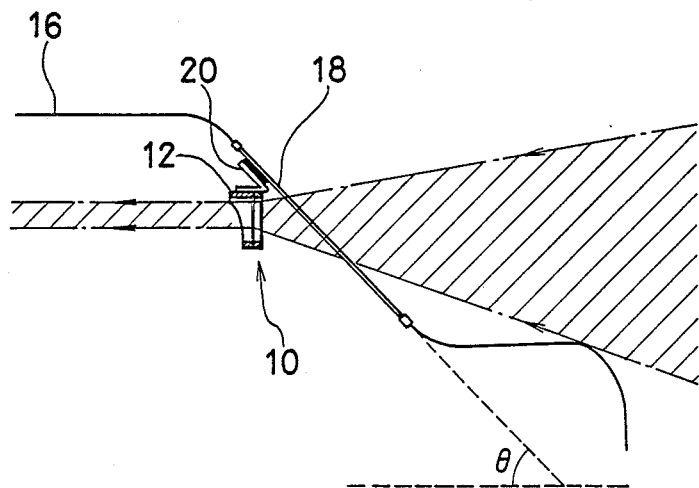
FIG. 2 is a schematic view showing the manner of mounting the rear monitoring device of FIG. 1 on the inner surface of the rear window glass of a vehicle.

FIGS. 1 and 2 illustrate an embodiment of a rear monitoring device for a vehicle according to the present invention. A rear monitoring device of the illustrated embodiment generally designated by reference numeral 10 comprises an optical mechanism 12 and mounting means 14 for mounting the optical mechanism 12 in the interior of a vehicle 16 and more specifically on the inner surface of the rear window glass 18 of the vehicle 16 as schematically shown in FIG. 2. In the illustrated embodiment, the mounting means 14 includes a bendable mounting member 20. The bendable mounting member 20 is formed of a metal sheet into a substantially L-shape so as to have a connection section 22 and a support section 24 which are connected to each other through a bent portion 26 defined therebetween. The bendable mounting member 20 is also formed so as to cause the angle between the connection section 22 and the support section 24 to be varied as desired by applying force of a predetermined level or more to said bendable mounting member 20 to variably deform or bend the mounting member 20 about the intermediate bent portion 26. The mounting means 14 also includes an adhesion element 28 provided on the connection section 22 of the bendable mounting member 20 which serves to adhesively bond the connection section 22 to the inner surface of the rear window glass of the vehicle. In the illustrated embodiment, the adhesion element 28 comprises a double-coated adhesive tape.

In the illustrated embodiment, as shown in FIG. 2, the optical mechanism 12 is mounted on a lower surface of the support section 24 of the deformable or bendable mounting member 20. Mounting of the optical mechanism 12 on the support section 24 may be carried out by means of such a double-coated adhesive tape as described above, a screw or the like. In the illustrated embodiment, the optical mechanism 12 may comprise such a conventional viewer as described above.

In the rear monitoring device of the illustrated embodiment constructed as described above, when the optical mechanism is mounted through the mounting means on the inner surface of the rear window glass of the vehicle, it may be positionally or angularly adjusted by applying force of a predetermined level or more to the mounting means to vary the angle between the connection section and support section about the bent portion. In the illustrated embodiment, the optical mechanism is vertically arranged. Thus, it will be noted that the rear monitoring device of the illustrated embodiment is effectively installed in the interior of the vehicle irrespective of the inclination angle $\theta$ of the rear window glass, so that it may be applied to various kinds of vehicles so long as they have a rear window glass.

Figure 3:
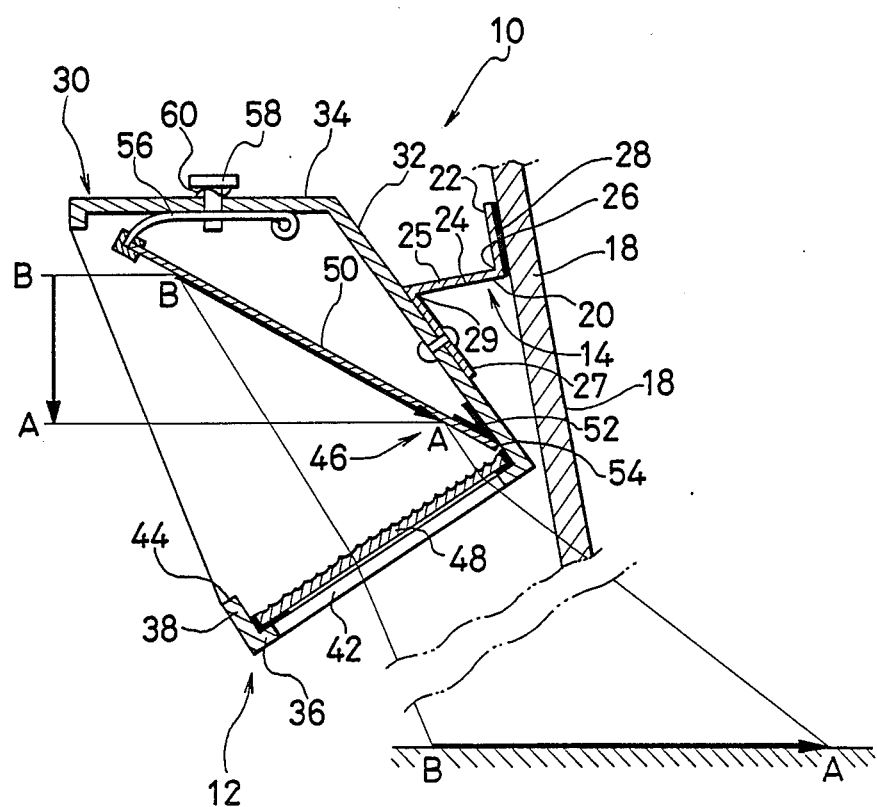
FIG. 3 is a vertical sectional view showing another embodiment of a rear monitoring device for a vehicle according to the present invention.
Figure 4:
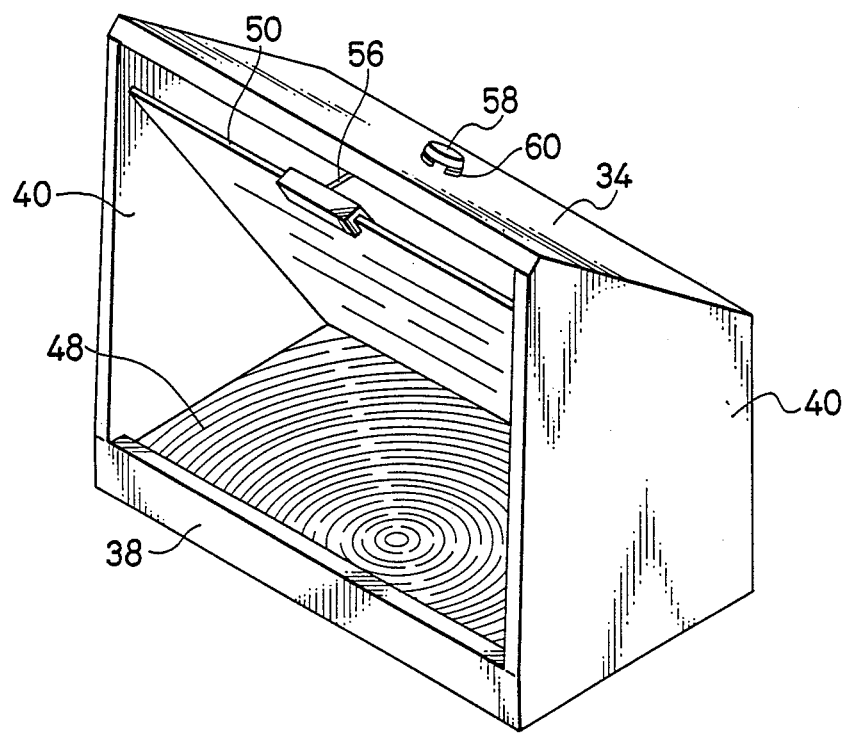
FIG. 4 is a perspective view of the rear monitoring device shown in FIG. 3.
Figure 5:
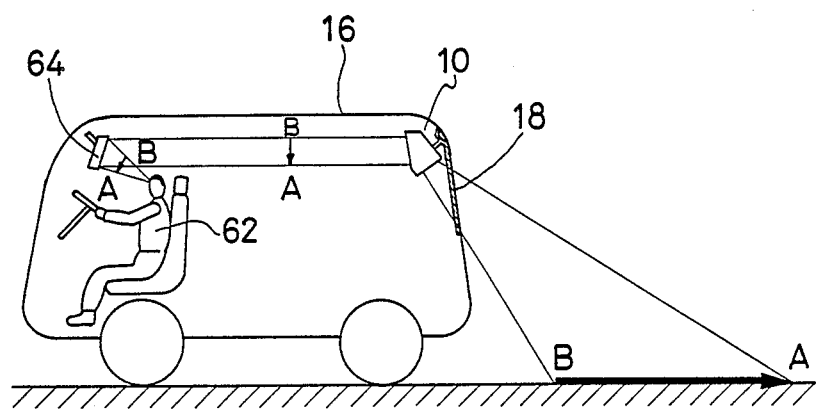
FIG. 5 is a schematic view showing the manner of using the rear monitoring device shown in FIG. 3.

FIGS. 3 to 5 show another embodiment of a rear monitoring device for the vehicle 16 according to the present invention. A rear monitoring device 10 of the embodiment includes an optical mechanism 12 and mounting means 14. The mounting means 14 may comprise a bendable mounting member 20 and an adhesion element or a double-coated adhesive tape 28. The bendable mounting member 20 may be generally formed of an aluminum sheet of about 0.6 mm in thickness into a substantially Z-shape so as to include a connection section 22 and a support section 24 which are connected to each other through a first bent portion 26 defined therebetween. The support section 24 itself is formed into a substantially L-shape to have an intermediate portion 25 connected to the connection section 22 and a holding portion 27 on which the optical mechanism 12 is held, said intermediate portion 25 and holding portion 27 being connected together through a second bent portion 29 defined therebetween. The bendable mounting member 20 may be so formed that the angles of the first and second bent portions 26 and 29 may be variably set in such a manner as described above. Alternatively, an angle of only either the first bent portion 26 or second bent portion 29 may be variably adjusted. The arrangement of two such bent portions 26, 29 facilitates the safe and effective mounting of the optical mechanism 12 to the rear glass window of the vehicle.

In the illustrated embodiment, the optical mechanism 12 is mounted on the holding portion 27 of the bendable mounting member 20 by means of a rivet. The optical mechanism 12 includes a casing 30 which is formed into a substantially C-shape in vertical side section. The casing comprises, as shown in FIGS. 3 and 4, a rear wall 32, a top wall 34 and a bottom wall 36 connected to the rear wall 32, a front wall 38 connected between the top wall 34 and the bottom wall 36, and a pair of side walls 40. The bottom wall 36 and front wall 38 are substantially opened to define openings 42 and 44, respectively. The casing 30 may be integrally formed. In the illustrated embodiment, the back wall 32 and top wall 34 are angularly connected to each other. However, they may be curvedly connected together.

In the so-formed casing 30 an optical system 46 is arranged which comprises a Fresnel concave lens 48 and a mirror element 50. The Fresnel concave lens 48 is arranged on the bottom wall 36 so as to cover the opening 42. The mirror element 50 used is flat and arranged so as to extend from a lower portion of the rear wall 32 to a front portion of the top wall 34 to form an acute angle between the mirror element 50 and the Fresnel concave lens 48 or cause both to obliquely intersect each other. The mirror element 50 may be formed of an acrylic resin material, which is preferable in that the mirror 50 may then be lightweight. The flat mirror element 50 may be pivotally connected at one end or a lower end thereof to the rear wall 32 of the casing 30 by suitable connection means 52 such as an adhesive tape including a double-coated adhesive tape, a hinge or the like so as to be pivotal about a connection 54 between the mirror 50 and the rear wall 32. In the illustrated embodiment, the connection means 52 comprises a double-coated adhesive tape. Also, the mirror element 50 may be connected at the other end or an upper end thereof to movable support means 56 so that the mirror element 50 may be pivotally mounted about the connection 54 to variably adjust the angle between the mirror element 50 and the Fresnel concave lens 48.

The movable support means 56 may comprise a metal wire of about 1 mm in diameter which is movably mounted on the top wall 34 of the casing 30. In the illustrated embodiment, the metal wire 56 is loosely or movably inserted through interposition means 58 such as a rivet or the like which is mounted on the top wall 34 and connected at one end thereof to the flat mirror element 50. The metal wire 56 may be a music wire or a phosphor bronze wire. Reference numeral 60 designates elastic means interposed between the interposition means 58 and the top wall 34 of the casing 30, which may be a corrugated washer, a spring washer, a rubber washer or the like. Alternatively, the illustrated embodiment may be modified in a manner such that the metal wire 56 and rivet 58 are replaced with a strip-like leaf spring of about 0.3 mm in thickness and a screw, respectively. In the modification, the leaf spring may be slidably arranged between the top wall 34 of the casing 30 and a holding plate provided at a tip end of the screw.

Alternatively, the support means 56 may comprise a pair of magic tape elements mounted on the top wall 34 and a top end of the mirror element 50 in a manner to be opposite to each other.

Now, the manner of operation of the embodiment described above will be described with reference to FIGS. 3 to 5.

In the rear monitoring device 10 of the illustrated embodiment, as shown in FIGS. 3 and 5, an image of an area indicated by an arrow A-B on a road which is located to the rear of the vehicle 16 and out of the visual field of a driver 62 is formed through the rear window glass 18 and the Fresnel concave lens 48 of the optical mechanism 12 of the rear monitoring device 10 on the flat mirror element 50 of the optical mechanism 12. Subsequently, the image is reflected on the mirror element 50 to be transferred to a rear view mirror 64 and observed by the driver 62.

It will thus be seen that the objects set forth above, among those made apparent from the preceding description, are efficiently attained and, since certain changes may be made in the above construction without departing from the sprit and scope of the invention, it is intended that all matter contained in the above description or shown in the accompanying drawings shall be interpreted as illustrative and not in a limiting sense.

What is claimed is:

1. A rear monitoring device for a vehicle adapted to permit a driver to observe therethrough area to a rear of the vehicle, comprising:
    an optical mechanism for forming an image of the area to the rear of the vehicle and transferring the image to the driver; and
    mounting means for mounting on an inner surface of a rear window glass of the vehicle to arrange said optical mechanism through said mounting means and on the inner surface of the rear window glass inside the vehicle;
    wherein said mounting means comprises a bendable mounting member for fixedly holding said optical mechanism, and an adhesive element for securely mounting said bendable mounting member on the inner surface of the rear window glass;
    said bendable mounting member being formed to allow an angle of said optical mechanism with respect to the rear window glass to be variably set.

2. A rear monitoring device as defined in claim 1, wherein said bendable mounting member is formed of a metal sheet into a substantially L-shape to have a connection section for mounting said bendable mounting member on the rear window glass therethrough and a support section for holding said optical mechanism on said bendable mounting member therethrough which are connected together through a bent portion defined therebetween.

3. A rear monitoring device as defined in claim 2, wherein said bendable mounting member is variably bent about said bent portion when force of a predetermined level or more is applied to the bendable mounting member.

4. A rear monitoring device as defined in claim 2, wherein said adhesion element comprises a double coated adhesive tape interposed between said connection section of said bendable mounting member and said rear window glass.

5. A rear monitoring device as defined in claim 1, wherein said optical mechanism comprises a casing opened at bottom and front walls thereof and a Fresnel concave lens and a mirror element arranged in said casing;
    said Fresnel concave lens being arranged to cover an opening in said bottom wall and said mirror element being arranged to reeflect an image formed thereon through said Fresnel concave lens in such a direction as to cause the image to be outwardly discharged through an opening in said front wall toward the driver.

6. A rear monitoring device as defined in claim 5, wherein said mirror element is inclinely arranged to form an acute angle between said mirror element and said Fresnel concave lens.

7. A rear monitoring device as defined in claim 6, wherein said mirror element is pivotally arranged to variably set said angle.

8. A rear monitoring device as defined in claim 7, wherein said mirror element is pivotally connected at a lower end thereof to a rear wall of said casing by connection means.

9. A rear monitoring device as defined in claim 8, wherein said connection means is a double-coated adhesive tape.

10. A rear monitoring device as defined in claim 8, wherein said mirror element is connected at an upper end thereof to movable support means movably mounted on said casing.

11. A rear monitoring device as defined in claim 10, wherein said movable support means comprises a metal wire mounted on a top wall of said casing.

12. A rear monitoring device as defined in claim 11, wherein said metal wire is mounted through interposition means arranged on said top wall.

13. A rear monitoring device as defined in claim 5, wherein said bendable mounting member is formed of a metal sheet into a substantially Z-shape to have a connection section for mounting said bendable mounting member on the rear window glass and a support section for holding said optical mechanism on said bendable mounting member therethrough connected together through a first bent portion defined therebetween;

said support section being formed into a substantially L-shape with a second bent portion being defined at an intermediate region thereof.

14. A rear monitoring device as defined in claim 13, wherein said bendable mounting member is bent about at least one of said first and second bent portions when force of a predetermined level or more is applied to said bendable mounting member.

15. A rear monitoring device as defined in claim 13, wherein said adhesion element comprises a double coated adhesive tape interposed between said connection section of said bendable mounting member and the rear window glass.

16. The device of claim 1, wherein the rear window glass is slanted with a lower edge thereof further away from a front of the vehicle than an upper edge thereof, and the window glass is situated substantially at eye level position of a driver in the vehicle.

17. The device of claim 13, wherein said support section is bent to define an intermediate portion and a holding portion for holding said optical mechanism, on opposite sides of said second bent portion.

* * * * *